(12) United States Patent
Bjørgum (10) Patent No.: US 11,427,494 B2
(45) Date of Patent: Aug. 30, 2022

(54) TEMPERING FURNACE AND METHOD FOR TEMPERING A GLASS OBJECT

(71) Applicant: Vosstech AS, Voss (NO)

(72) Inventor: Stig Ove Bjørgum, Voss (NO)

(73) Assignee: Vosstech AS, Voss (NO)

( * ) Notice: Subject to any disclaimer, the term of this patent is extended or adjusted under 35 U.S.C. 154(b) by 845 days.

(21) Appl. No.: 16/076,175

(22) PCT Filed: Feb. 10, 2017

(86) PCT No.: PCT/IB2017/050738
§ 371 (c)(1),
(2) Date: Aug. 7, 2018

(87) PCT Pub. No.: WO2017/137939
PCT Pub. Date: Aug. 17, 2017

(65) Prior Publication Data
US 2021/0188689 A1    Jun. 24, 2021

(30) Foreign Application Priority Data
Feb. 11, 2016   (NO) .................................. 20160233

(51) Int. Cl.
*C03B 35/00*   (2006.01)
*C03B 27/00*   (2006.01)
*C03B 27/06*   (2006.01)

(52) U.S. Cl.
CPC ............ *C03B 27/06* (2013.01); *C03B 35/005* (2013.01)

(58) Field of Classification Search
None
See application file for complete search history.

(56) References Cited

U.S. PATENT DOCUMENTS

| | | |
|---|---|---|
| 2,170,749 A | 8/1939 | Forbes |
| 2,239,796 A | 4/1941 | Stratton |
| 2,375,944 A | 5/1945 | Quentin |
| 2,377,536 A | 6/1945 | Wisner |
| 2,886,921 A | 5/1959 | Lueck et al. |

(Continued)

FOREIGN PATENT DOCUMENTS

| | | |
|---|---|---|
| CH | 337 621 A | 4/1959 |
| FR | 2 160 262 A1 | 6/1973 |

(Continued)

OTHER PUBLICATIONS

Nielsen et al. Finite element implementation of a glass tempering model in three dimensions. Computers and Structures 88 (2010) 963-972. (Year: 2010).*

(Continued)

*Primary Examiner* — Erin Snelting
(74) *Attorney, Agent, or Firm* — Osha Bergman Watanabe & Burton LLP (57) ABSTRACT

A tempering furnace for tempering a glass object may include a housing, a heating device for heating the glass object, and a cooling device for cooling the glass object. Additionally, the tempering furnace may further include a turning device provided for turning the glass object inside (Continued)

the housing. The turning device is configured to counteract an effect of gravitational forces on the glass object when the glass object is heated to its softening phase.

3 Claims, 11 Drawing Sheets

(56) References Cited

U.S. PATENT DOCUMENTS

| | | | | |
|---|---|---|---|---|
| 3,087,316 | A | * | 4/1963 | Nitschke ............ C03B 27/0404 65/268 |
| 3,155,481 | A | * | 11/1964 | Boyce ................. C03B 27/06 65/104 |
| 3,620,706 | A | * | 11/1971 | Spanoudis ............ C03B 29/00 65/114 |
| 3,650,724 | A | * | 3/1972 | Lush .................. C03B 33/06 65/174 |
| 3,765,861 | A | | 10/1973 | Bole et al. |
| 4,735,645 | A | * | 4/1988 | Wasylyk ............. C03B 27/062 65/114 |
| 2006/0016220 | A1 | | 1/2006 | Spaeth et al. |
| 2008/0120996 | A1 | * | 5/2008 | Radermacher ........ C03B 35/202 65/106 |
| 2010/0147028 | A1 | * | 6/2010 | Boaz ................... C03B 27/062 65/66 |

FOREIGN PATENT DOCUMENTS

| | | | | |
|---|---|---|---|---|
| FR | 2415609 | A1 | * | 8/1979 ............ C03B 29/06 |
| GB | 506723 | A | | 5/1939 |
| GB | 521 553 | A | | 5/1940 |
| GB | 647 774 | A | | 12/1950 |
| JP | H04-275931 | A | | 10/1992 |
| JP | 2001-012862 | A | | 1/2001 |
| SE | 359527 | B | | 9/1973 |
| WO | 2004/052798 | A1 | | 6/2004 |
| WO | 2011/150063 | A2 | | 12/2011 |

OTHER PUBLICATIONS

JP 2001-012862 A (Yoshida) Jan. 19, 2001 (English language machine translation), [online] [retrieved Dec. 15, 2021], Retrieved from: Espacenet. (Year: 2001).*
International Search Report issued in PCT/IB2017/050738 dated Jun. 1, 2017 (6 pages).
Written Opinion of the International Searching Authority issued in PCT/IB2017/050738 dated Jun. 1, 2017 (8 pages).
Norwegian Search Report issued in NO 20160233 dated Sep. 10, 2016 (2 pages).

* cited by examiner

TEMPERING FURNACE AND METHOD FOR TEMPERING A GLASS OBJECT

FIELD OF INVENTION

The present invention concerns a tempering furnace for tempering a glass object, as well as a method of tempering a glass object. Specifically, the invention concerns glass objects for well tools, which are applicable in oil and/or gas wells, wherein the glass object initially provides a pressure tight barrier for the fluid in the well, and, wherein the barrier easily may be removed by crushing the glass object.

It is envisioned that glass objects capable of withstanding high pressure differences have different fields of application, such as for instance inspection glass in nuclear power plants, portholes in diving bells, submarines, lenses of underwater cameras, etc.

In addition, the invention concerns a method of tempering a glass object.

BACKGROUND OF THE INVENTION

Generally, tempering of glass takes place by heating the glass to a specific temperature range, and, then the glass is cooled again. This causes compression stress and tensile stress in different areas of the glass. Tempering of glass provides the glass with (at least) two features compared to non-tempered glass:
1) Tempered glass is stronger and can withstand higher pressure and temperatures.
2) Tempered glass, when crushed, will be separated into very small pieces of glass.

Both these features are desirable for tools in oil and or gas wells. The first feature is important in for instance windows in deep-water equipment.

Generally, glass like this is tempered lying on a plate, or on rollers in a furnace; whereafter heat is applied and the glass is heated in a certain period of time before the glass is cooled again, where the cooling process preferably is fast.

One of the challenges of using such glass objects in well tools is that the interface between the glass and the so-called seat, to which the glass is fastened (typically made from high quality steel or other metal), also has to be able to withstand the same pressure loads. This has proved to be challenging, especially for tools, which have to be able to withstand both high differential pressure and high temperatures. In some tempering processes, it has been observed that the shape of the glass changes to the extent that it is difficult to make sure the interface between the glass and the seat is capable of withstanding high pressure in high temperatures. Further, in some tempering processes, it has been observed that the number of damaged glasses have been high, i.e. the breakage rate is high.

There is known several prior art tempering furnaces for tempering glass, especially for tempering car glass, wherein the glass shall also be curved during the tempering process. An example of this is disclosed in SE 359527. U.S. Pat. Nos. 506,723 and 2,170,749 disclose different systems for suspending glass in a conveyor path through a tempering furnace. These systems are limited by the heat being confined to a certain temperature; if the temperature is too high, the glass gets soft and will detach from the suspension system.

The object of the invention is to provide an improved tempering furnace for tempering glass objects, and an improved method of tempering glass objects. Thus, the object is to produce tempered glass capable of withstanding higher pressure, and, wherein, the glass, together with the fastening of the glass, is capable of withstanding higher pressure at higher temperatures.

Another object is to obtain more even distribution of heat during heating and cooling, because it is believed this would provide more uniformly tempered glass, and, that this contributes to increase the maximal strength of the glass. In addition, it is an object to cool the glass object faster, because it is believed that this would contribute to increase the maximal strength of the glass.

Further, it is an object of the present invention to avoid handling glass objects during heating and cooling. By "handling" here, it is meant for instance to lift the glass from a heating station, and then transfer the glass in a heated state to a cooling station.

SUMMARY OF THE INVENTION

The objects above are achieved with a tempering furnace for tempering a glass object as defined in claim 1, comprising:
  a housing,
  a heating device for heating the glass object,
  a cooling device for cooling the glass object,
  characterized in that the tempering furnace comprises a turning device provided for turning the glass object inside the housing.

The heating device and cooling device may be the same device. The glass object may be situated inside the housing during heating or cooling, or, during both heating and cooling. The tempering furnace may comprise several housings—a first housing for heating, and a second housing for cooling. The housing may be a closed housing, which encloses the glass object inside, or it can be a partly closed housing only enclosing parts of the glass object.

In one aspect of the invention, the turning device is configured to counteract the effect of gravity on the glass object when the glass object has been heated to its softening phase. By softening phase here, it is meant that the glass object has been heated to a temperature higher than the glass transition temperature, but lower than the melting temperature.

In one aspect, the heating device and/or cooling device comprise a fluid spray device for spraying a heating and/or cooling fluid towards the glass object, respectively.

In one aspect, the fluid spray device has been configured at least to contribute to turning and/or supporting the glass object. When fluid is sprayed towards the glass object in a certain amount and/or with a certain pressure, this will apply a force onto the glass object. Consequently, the glass object may be supported by spraying two fluid streams against opposite sides of the glass object.

In one aspect, the turning device is provided to rotate the glass object inside the housing. Thus, rotation about a single axis is considered to represent a first type of turning. Turning may also be different from rotation.

In one aspect, the glass object comprises a substantially circular circumferential surface, wherein the turning device comprises a first rotatable roller and a second rotatable roller configured for rotating the glass object.

In one aspect, a cylindrical surface or chamfered surfaces of the glass object are provided in contact with the first and second rotating rollers.

In one aspect, the cylindrical surface or the chamfered surfaces of the glass object are provided in contact with a conveyor belt provided around the rollers and the glass object.

In one aspect, the turning device comprises an attachment device for attaching the turning device to the glass object.

In one aspect, the turning device comprises a transporting device for transporting and turning the glass object along a path. This path does not need to be rotation about a single axis, and consequently, this may be considered to represent a second type of turning.

In one aspect, the turning device is provided for turning a plurality of glass objects.

In one aspect, the turning device comprises:
- a first support ring attached to the glass object,
- a second support ring rotationally attached to the first support ring by a first rotation axis, wherein the diameter of the second support ring is larger than the diameter of the first support ring,
- a third support ring rotationally attached to the second support ring at a second rotation axis different from the first rotation axis, wherein the diameter of the third support ring is larger than the diameter of the second support ring.

In one aspect, the first and second rotation axis intersect close to the center of the support rings and the glass object.

In addition, the fluid spray device may be configured to drive the turning device, in this case by fluid being sprayed towards the glass object and/or the rings, after which at least one of the rings are put into rotational movement.

In addition, the present invention concerns a method of tempering a glass object, comprising the following steps:
- heating the glass object,
- cooling the glass object,
- turning the glass object during the heating of the glass object.

In one aspect, the method comprises the following step: turning the glass object during cooling of the glass object.

In one aspect, the method comprises the following steps:
- the heating comprises heating the glass object until it reaches its softening phase,
- the turning of the glass object is conducted to counteract the effect of gravity on the glass object when the glass object is heated to its softening phase. The softening phase is defined above.

In one aspect, the method comprises the following step: the turning comprises rotation of the glass object or transport and turning of the glass object along a path.

In addition, the present invention concerns a glass object tempered in accordance with the method above.

DETAILED DESCRIPTION

Embodiments of the invention will now be described with reference to the appended Figures, wherein.

Several challenges have been revealed in the provision of glass objects with higher strength. Through trial and error, it has been found that higher tempering temperature results in higher strength of the tempered glass. Further, it has been found to be advantageous that the glass object is heated during a certain period of time to ensure that not only the outer surface of the glass is tempered. Maintaining high temperature over time will cause the glass to sag because of gravity affecting the glass when it is in a plastic phase or softening phase. The temperature at which the softening phase initiates is called the glass transition temperature, and is called Tg. Thus, this glass transition temperature is the temperature or temperature range at which the glass changes from being rigid and relatively brittle to a progressively softer glass. This glass transition temperature is always lower than the melting temperature called Tm. Consequently, that a glass object is heated to its softening phase means that it has been heated to a temperature higher than its glass transition temperature Tg; however, lower than the melting temperature, Tm.

Figure 11A:
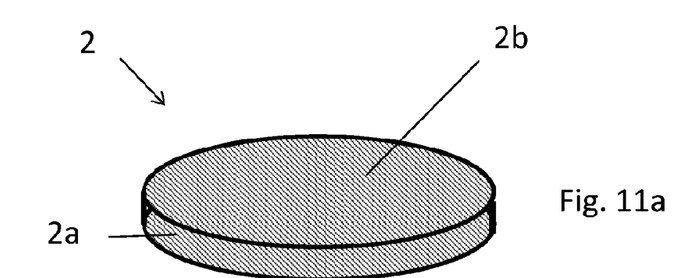
Figure 14A:
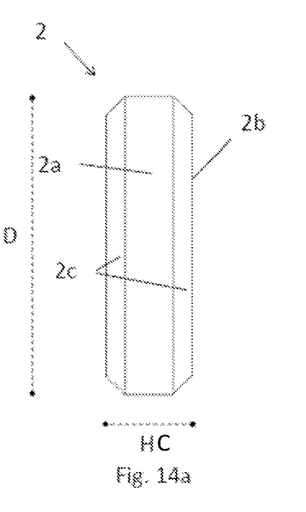
FIG. 14a shows a known glass object with chamfered edges used in known well tools.

In the prior art, the gravitational forces make a glass object 2 (e.g. as shown in FIG. 11a or 14a) lying with one side 2b against a plate in a tempering furnace to change shape, because the part of the glass object 2 facing the plate achieves a larger diameter than the part of the glass object facing up from the plate. Further, there will be some different temperature changes on the side facing upward (in contact with air/fluid in the tempering furnace) and the side facing down (in contact with the plate) during heating and cooling of the glass object, which causes the glass to not always having withstood the same pressure in both directions.

To avoid this, tempering glass at temperatures at which the glass is in its softening phase has largely been avoided.

To avoid this, glass objects tempered in accordance with the prior art have alternatively been grinded or polished to obtain a precise shape adapted to the attachment. Such a grinding or polishing will reduce the strength of the glass object, and, consequently, is not desired.

Figure 1:
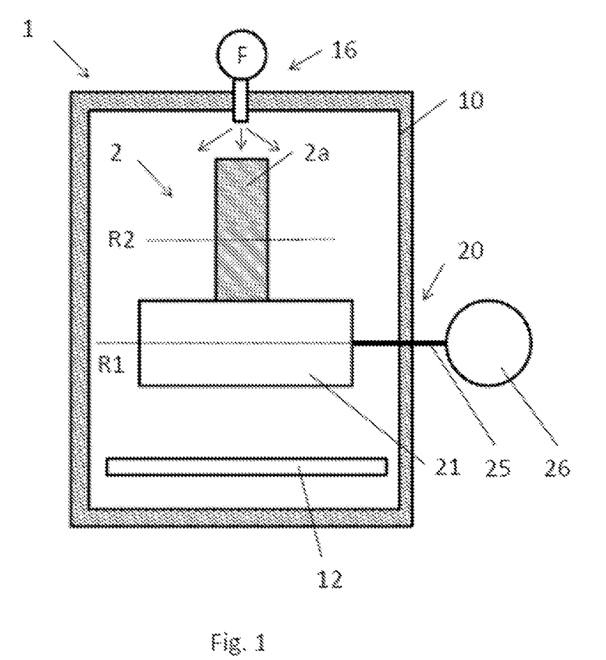
FIG. 1 schematically shows a first embodiment of the tempering furnace in a front view.

Reference is made to FIG. 1, which shows a first simplified embodiment of a tempering furnace 1. The tempering furnace 1 comprises a housing 10. The housing 10 is preferably isolated, and, further, has a closed and open state. In the closed state, the housing is preferably relatively tight, such that the heating process and cooling process may take place in an energy efficient manner. In the open state, it is relatively easy to remove and insert glass objects 2 in the tempering furnace 1. Opening/closing may be performed by the housing being divided into two parts, which are held together in closed state and displaced away from each other in open state, or, by providing a hatch or door or the like into the tempering furnace.

Further, the housing 10 comprises a heating device 12 for heating the glass object 2, as well as a cooling device 16 for cooling the glass object 2. In FIG. 1, the heating device 12 is a heating element provided inside the housing 10, under the glass object 2. The heating element may be supplied with electrical power; it may be heated when heated fluid, such as pre-heated pressurized air, is circulated through the heating element. Preferably, the tempering furnace 10 comprises a thermostat inside the housing 10 connected to a temperature actuating device (not shown) on the outside of the housing 10 for controlling the heating device 12 such that control of the tempering temperature is obtained. Further, preferably, the power of the heating device 12 may be controlled by a power actuating device (not shown) to control how fast the heating proceeds.

In FIG. 1, the cooling device 16 is provided in an upper end of the housing 10, and comprises a fan F having nozzles capable of spraying cooling cold fluid (e.g. air or another gas, alternatively a liquid such as water) on to the glass object. The fluid can also be a mixture of air and water/liquid droplets which evaporate when hitting the glass surface, and which draws the evaporating heat from the glass such that a very fast cooling takers place.

Further, the tempering furnace 1 comprises a turning device 20 provided for turning the glass object 2 inside the housing 10. The turning device 20 is configured to counteract the effect of gravity on the glass object 2 when the glass object 2 is heated to its softening phase. As an example a glass object will have to be maintained in a similar position for a certain time period before the effects of gravity becomes visible in the shape of the glass. Of course, this will be dependent on type of glass material and temperature. Thus, to avoid this, the invention uses the turning device 20. Several relevant variants of this turning device will be described below. However, it should be pointed out that a pure rotation of the glass object in the horizontal plane is not considered turning in this case, because such a turning device would not be suitable for counteracting the effect of gravity on the glass object 2 when the glass object 2 is heated to its softening phase.

Further, it should be pointed out that the examples below are based on glass objects 2 for use in well tools, as shown in the Figures. As mentioned, these have circular surfaces 2a, 2c, which causes the glass objects to have a substantially cylindrical shape. The Figures show glass objects having a diameter D larger than the height HC of the cylinder; however, it is also possible to use the tempering furnace for glass objects in which the height of the cylinder is larger than the diameter.

Optical glass is in this so-called softening phase form a temperature of about 450 degrees and higher.

The heating preferably takes place inside the housing 10. Also the cooling preferably takes place inside the housing 10; however, the housing 10, or parts of the housing 10, may be removed by moving the walls away from the glass object during the cooling.

Figure 2:
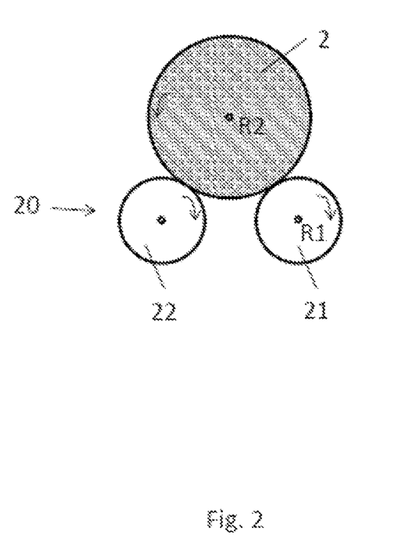
FIG. 2 shows the turning device of FIG. 1 viewed from the side.

Reference is made to FIGS. 1 and 2. The turning device 20 is here provided for rotating the glass object 2 inside the housing 10. The turning device 20 here comprises a first rotatable roller 21 and a second rotatable roller 22 configured for rotating the glass object 2. One of the rollers 21, alternatively both the rollers 21, 22, may be connected to a motor 26 via a shaft 25 for rotating the roller 21 about the axis R1 and the glass object about the axis R2. In FIG. 1, the cylindrical surface 2a of the glass object 2 is provided in contact with the first and second rotating rollers 21, 22.

Figure 3:
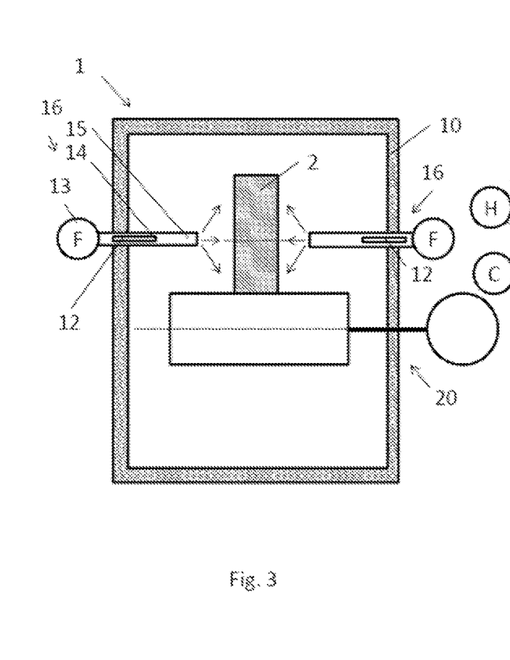
FIG. 3 shows an alternative embodiment of the tempering furnace of FIG. 1.

Reference is now made to FIG. 3. Here, the heating device 12 and cooling device 16 comprise several common elements in the form of a fluid spray device comprising a fan or pump 13, a fluid guide 14, and nozzles directed 15 directed to the glass object 2 inside the tempering furnace 1. The heating device 12 is here indicated as a heating element in the fluid guide.

Figure 4:
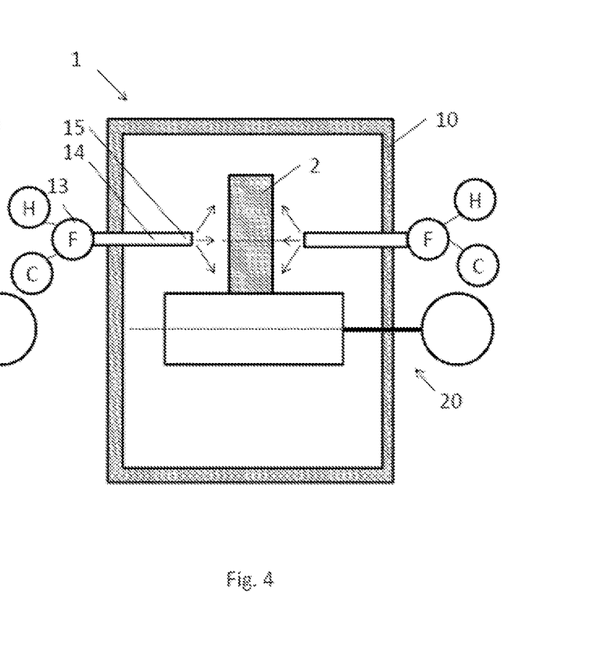
FIG. 4 shows another alternative embodiment of the tempering furnace of FIG. 1, FIGS. 5 and 6 show an alternative embodiment of the turning device seen from the side and in a front view, respectively.

FIG. 4 corresponds to FIG. 3, the pump device or fan device 13 is here coupled to a hot H and a cold C fluid source, which are used during heating and cooling, respectively.

Preferably, in FIGS. 3 and 4, the nozzles 15 are directed towards the side surfaces 2b of the glass object to obtain a fast heating/cooling. A further function may be that they contribute to supporting the glass object 2, such that it does not topple; this may be especially suitable for glass objects having large diameter D and small height HC (see FIG. 14a).

Figure 5:
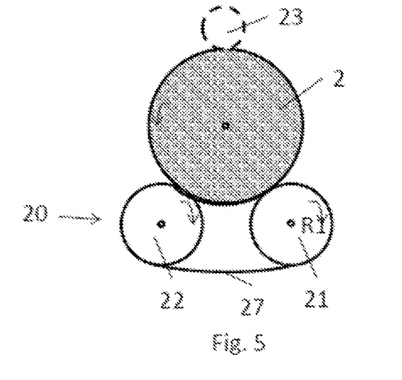
Figure 6:
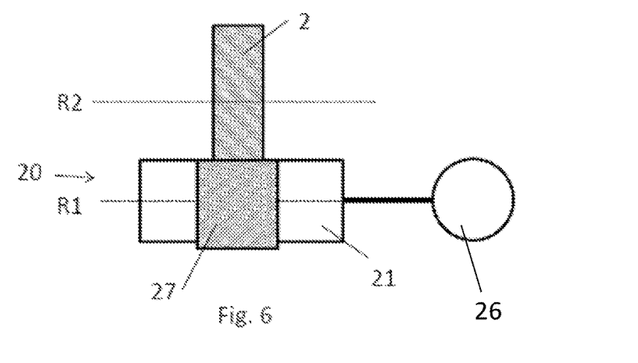

FIGS. 5 and 6 show an alternative embodiment of the turning device 20 shown in FIGS. 1 and 2. Here, a conveyor belt 27 is provided around the rollers 21, 22 and the glass object 2 to increase the friction between the glass object 2 and the turning device 20.

In FIG. 5, a third roller 23 is shown; which is arranged above the glass object 2. The roller 23 may be used for stabilizing the glass object; i.e. avoid toppling during rotation. The third roller 23 may be used in other embodiments as well.

Figure 7:
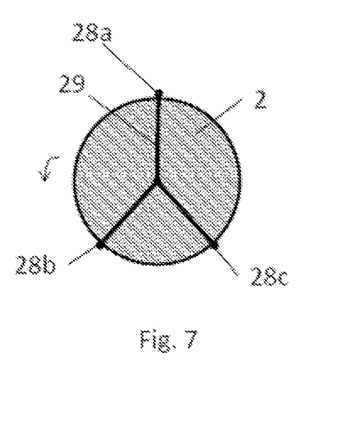
FIGS. 7 and 8 show another alternative embodiment of the turning device viewed from the side and in a front view, respectively, FIGS. 9a, 9b, and 9c, as well as FIG. 10 show several alternative embodiments of the turning device, FIG. 11a show a cylindrical glass object without chamfered edges, viewed in perspective.
Figure 8:
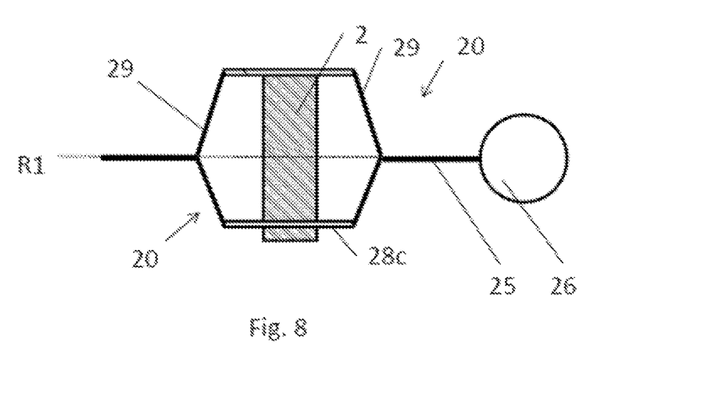

Reference is made to FIGS. 7 and 8. In this case, the turning device 20 comprises contact elements 28a, 28b, 28c, wherein the contact elements hold the glass object between each other. The contact elements 28a, 28b, 28c are attached via strut 29 to the shaft 25, and to the motor 26. Here, the glass object 2 is rotated about the same axis R1 as the rotational axis of the motor 26. In addition, the contact elements 28a, 28b, 28c, may be provided in rotation such that the points of contact between the axis and the glass are not the same during the complete operation. In this way, the risk of obtaining dents or irregularities in the glass object is reduced.

Figure 9A:
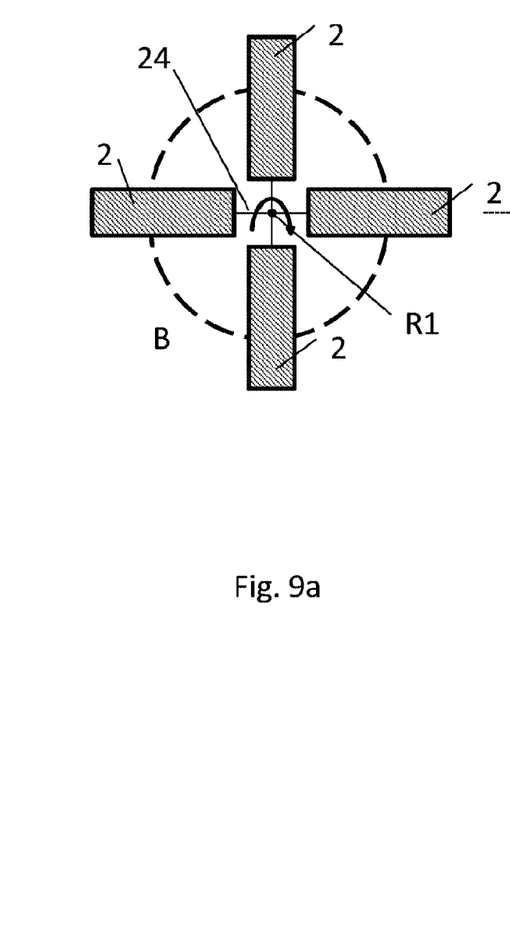

Reference is made to FIG. 9a. Here, the turning device 20 comprises a transporting device 24 attached to four glass objects for transporting and turning the glass object 2 in a path B. The path B has a rotational axis R1. In this case, all the glass objects will be turned similarly.

Figure 9B:
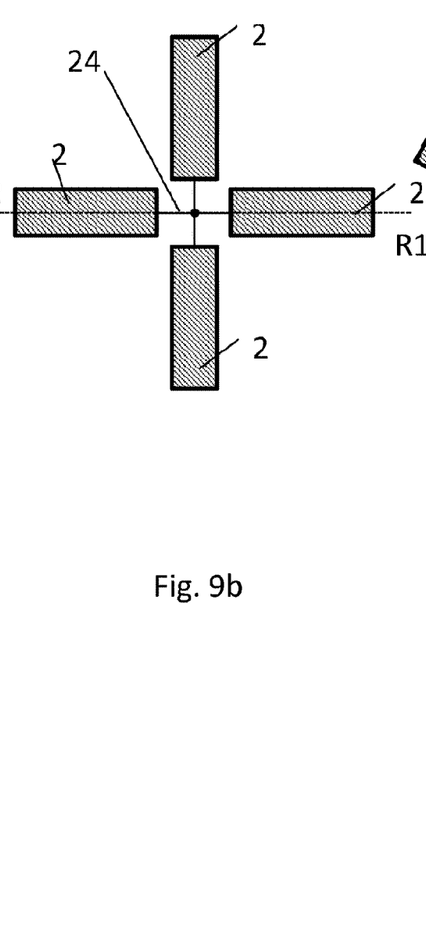

Reference is made to FIG. 9b. Again, in this case, the transporting device 24 is rotated about an axis R1 different from the axis R1 of FIG. 9a. Here, the glass objects are rotated differently; however, there will still be a turning of the glass objects.

Figure 9C:
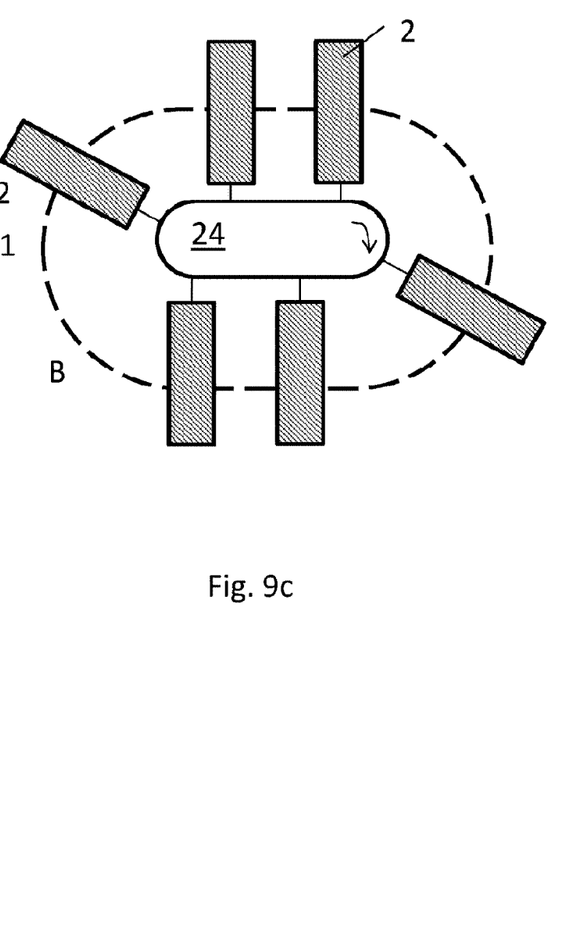

Reference is made to FIG. 9c. Here, the turning device 20 comprises a transporting device 24 turning the glass objects in an oval-like or oblong path B.

Figure 10:
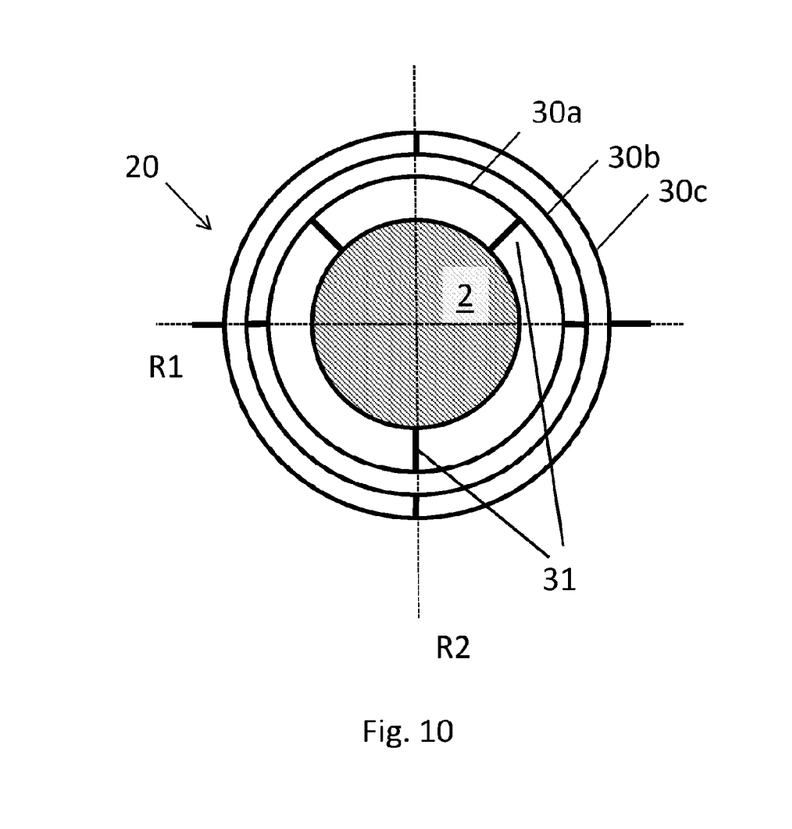

Reference is made to FIG. 10. In this case, the turning device 12 comprises a first support ring 30a attached to the glass object 2. A second support ring 30b is rotatable attached to the first support ring 30a by a first rotational axis R1, wherein the diameter of the second support ring 30b is larger than the diameter of the first support ring 30a. A third support ring 30c is rotatable attached to the second support ring 30b by a second rotational axis R2 different from the first rotational axis R1, wherein the diameter of the third support ring 30c is larger than the diameter of the second support ring 30b. Preferably, the first and second rotational axis R1, R2 intersect close to the center of the support rings 30a, 30b; i.e. close to the center of the glass object 2. In this variant, the rings are freely rotatable to each other, and the turning takes place by the fluid spray devices 13, 14, 15 being configured to rotate the support rings, and, thus, the glass object 2 in relation to each other, by fluid being sprayed towards the glass object 2 and/or the rings 30a, 30b, 30c; whereafter at least the first of the rings is set into rotation, and thus, the glass object 2 is rotated.

Figure 11B:
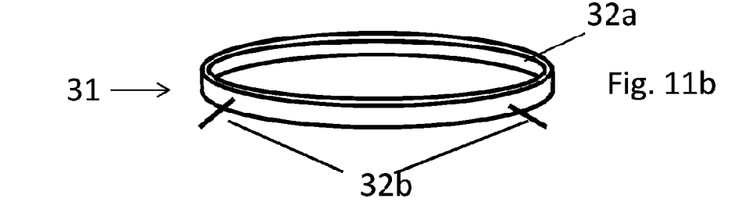
FIG. 11b shows an attachment device for a glass object.
Figures 11C, 11D:
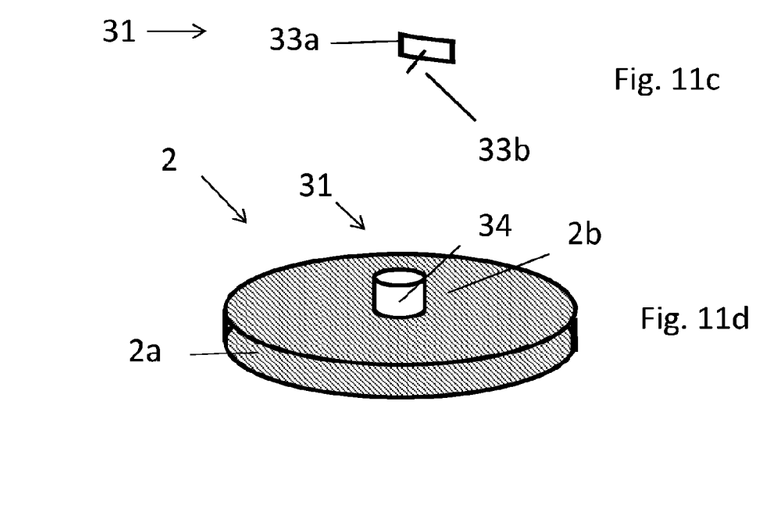
FIG. 11c shows an alternative embodiment of an attachment device.
FIG. 11d shows a further alternative embodiment of an attachment device.

Reference is made to FIGS. 11b, 11c, and 11d, wherein different attachment devices 31 for attaching the turning device 12 to the glass object 2 is shown. In this case, the attachment devices 31 are considered part of the turning device 20.

The attachment device 31 of FIG. 11b comprises a ring 32a for arrangement around the surface 2a of the glass object 2 (see, FIG. 11a), and, possibly strut 32b for attaching the ring 32a to other parts of the turning device 20.

The attachment device 31 of FIG. 11c comprises a ring element 33a for attachment to the surface 2a; e.g. with an adhesive or by several such ring elements 33a being pressed against the surface 2a at different areas around the surface 2a. Here too, strut 33b may possibly be used.

The attachment device 31 of FIG. 11d comprises an attachment device 34 for attachment to the surface 2b of the glass object 2; e.g. by an adhesive. In this case, the attachment device 34 may for instance be circular, and is put onto or coupled to a roller, for in this manner to achieve that the surface 2b is in contact with heating/cooling fluid during the complete process.

Figure 12:
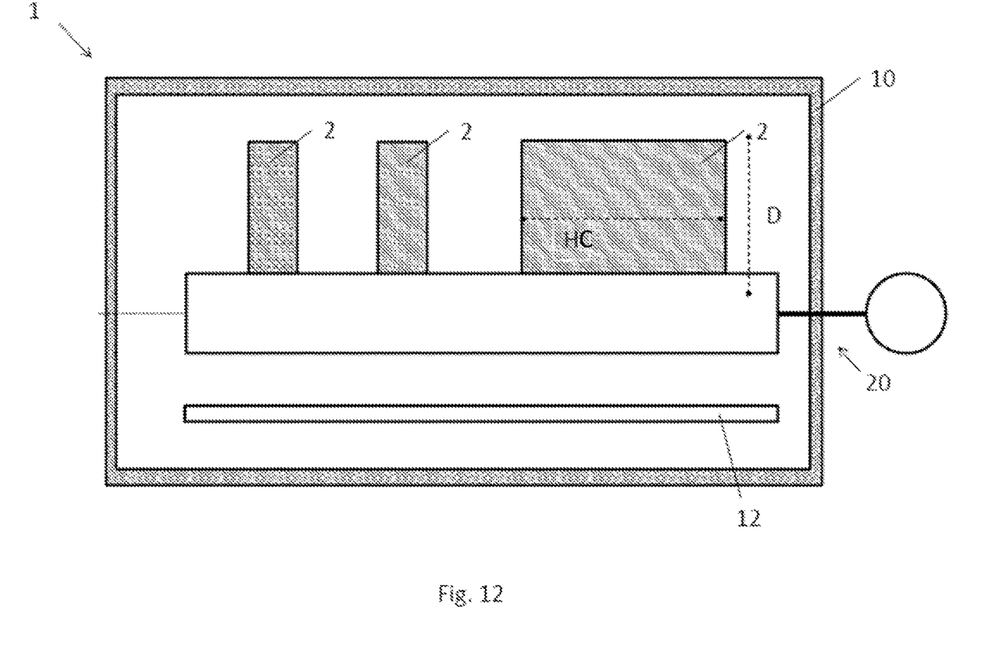
FIG. 12 shows a tempering furnace similar to the one in FIG. 1, however, with room for several glass objects.

FIG. 12 shows a tempering furnace 1 corresponding to FIG. 1. Here, it is shown that several glass objects are tempered; also a glass object having height HC larger than diameter D. It is to be noticed that glass objects of different sizes should not be tempered in the same process, because larger objects will generally require heating and cooling for a longer time.

Figure 13A:
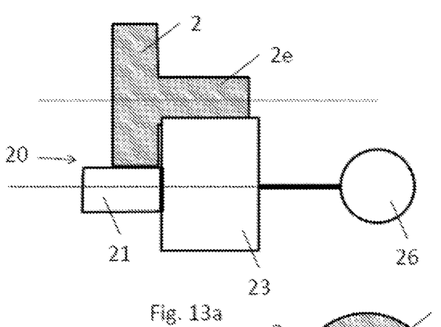
FIG. 13a-13c show a turning device for a glass object with varying diameter viewed from the front, from the side, and from the rear, respectively, wherein the third roller of FIG. 13c is drawn partially transparent.
Figure 13B:
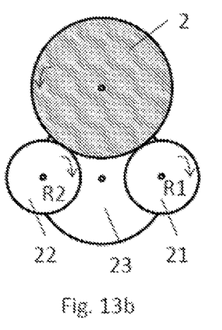
Figure 13C:
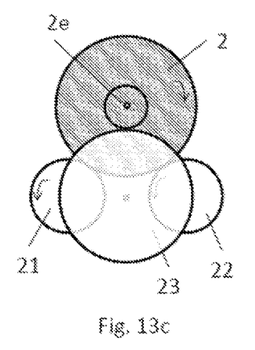

FIGS. 13a, 13b, and 13c show the turning device 20 for a glass object comprising a cylindrical part 2 with a large diameter, and a cylindrical part 2e with a relatively smaller diameter.

In this case, rollers 21, 22 can be used for supporting and rotating the larger cylindrical part 2, as in FIG. 2, while a third roller 23 having a larger diameter may be used to support the cylindrical part 2e having the smaller diameter. In FIG. 13a, the third roller 23 is coupled to the motor 26.

Figure 13D:
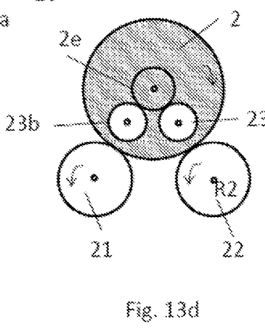
FIG. 13d shows an alternative turning device to the one shown in FIGS. 13a-13c.

FIG. 13d shows an alternative embodiment of FIG. 13a-c. In this case, two small rollers 23a, 23b for supporting the cylindrical part 2e, with relatively smaller diameter, are used.

Figure 13E:
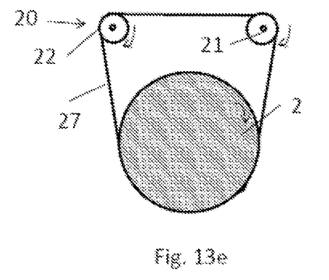
FIG. 13e shows a second alternative turning device to the one shown in FIGS. 13a-13c .

FIG. 13e shows a turning device 20, wherein a conveyor belt 27 is suspended from two rotating rollers 21, 22. The glass object 2 is then arranged suspended from the conveyor belt 27.

Figure 14B:
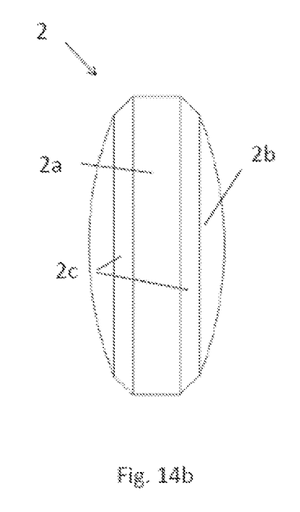
FIGS. 14b and 14c show a glass object with convex side surfaces.
Figure 14C:
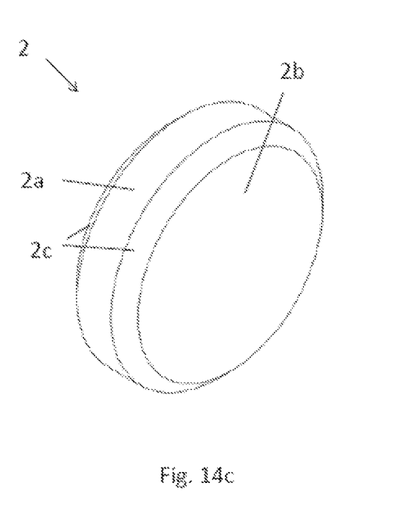

An advantage of the present invention is that it is possible to achieve tempering of glass objects having two convex surfaces 2b, as shown in FIG. 14b, 14c. Previously, at least one of the surfaces 2b have had to be plane to be arranged on the plane base in tempering furnaces in accordance with the prior art.

Figure 15:
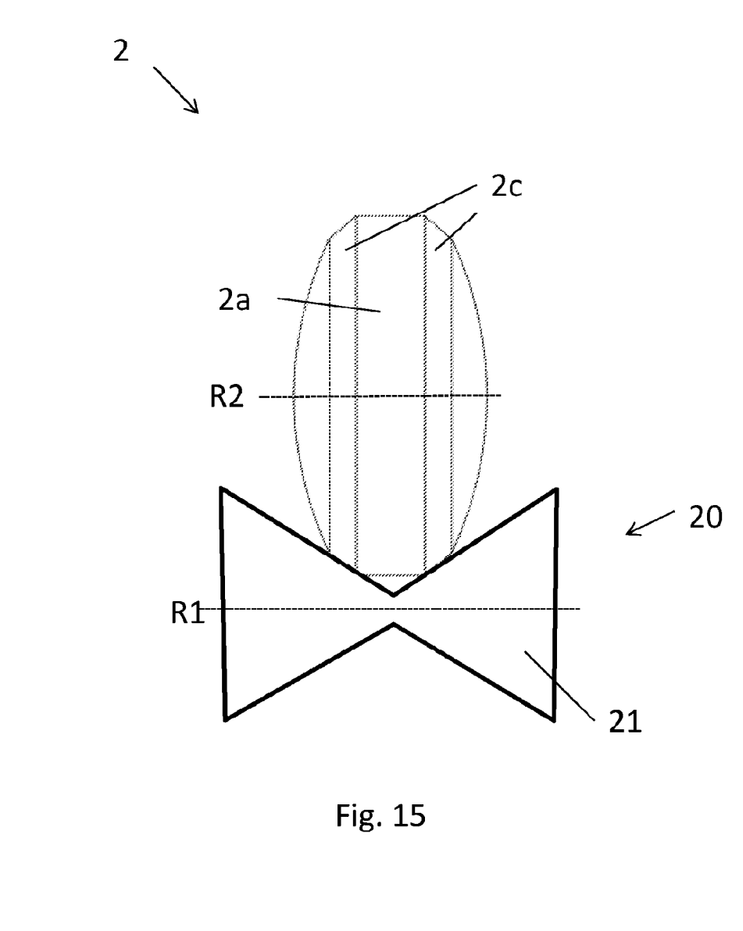
FIG. 15 shows an embodiment wherein the turning device is in contact with chamfered surfaces of the glass object.

FIG. 15 shows a roller 21 wherein only the chamfered surfaces 2c are in contact with the roller. Here, the roller 21 has a substantial hourglass shape. In this variant, the rear roller 22 (not shown in FIG. 15) preferably also has an hourglass shape. Thus, in this case, the surface 2a is not in contact with the roller(s).

Figure 16:
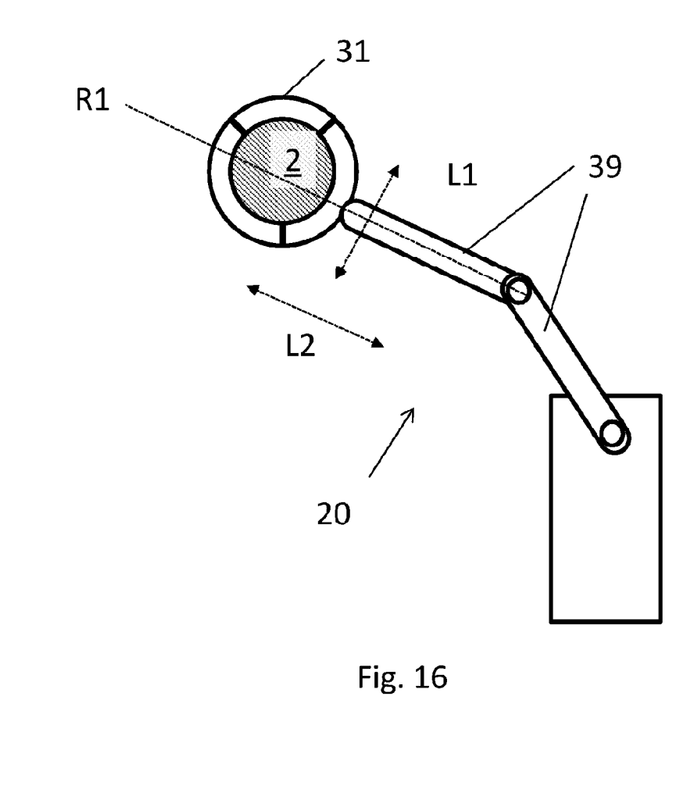
FIG. 16 shows an embodiment wherein the turning device is a robotic arm.

FIG. 16 shows a turning device 20 comprising a robotic arm 39, and an attachment device 31, which can turn the glass object 2 inside a tempering furnace. The complete robotic arm may be inside the tempering furnace; parts of the robotic arm may also be outside the tempering furnace 1. As shown, the robotic arm may rotate the glass object around the axis R1; however, it is also possible to move the glass object along the lines L1, L2 in addition to rotation.

Figure 17:
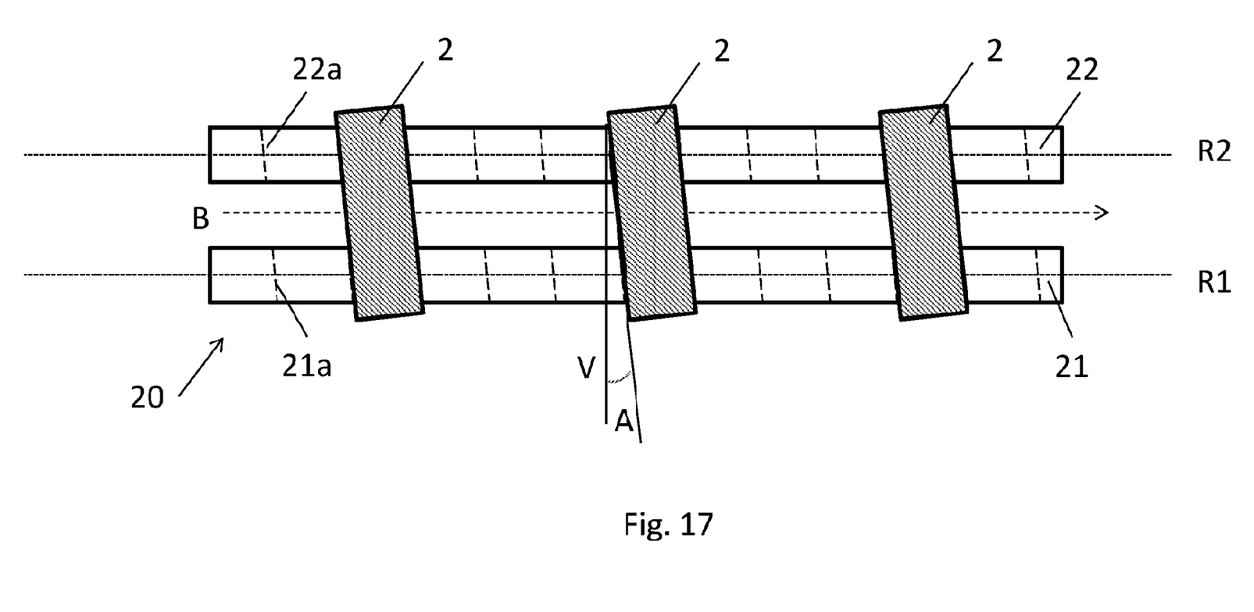
FIG. 17 shows an embodiment wherein the turning device rotates the glass objects and at the same time, moves the glass objects in a linear path.

FIG. 17 shows a turning device 20, seen from above, wherein rollers 21, 22 comprise chamfered or spirally shaped slots 21a, 22a having an angle A to the axis V perpendicular to the rotation axis R1, R2. The angle A may for instance be 1-10 degrees; and thus, the glass objects are transported linearly in the path B. This principle may be used in a production process in which the glass objects are first transported into a hot area, and then into a cold area. Along the complete path B, the glass objects will be rotated.

Preferably, the heating takes place inside the housing 10 for energy efficient heating. In this case, the cooling may take place inside the same housing 10; however, in a distance from the place of heating, or on the outside of the housing 10—either in a further housing arranged adjacent to the first housing 10, or freely inside the production facility. Then, the walls of the housing or housings may be elevated or lowered to allow the glass objects to pass out of and into the housings from its position along the path B.

Figure 18:
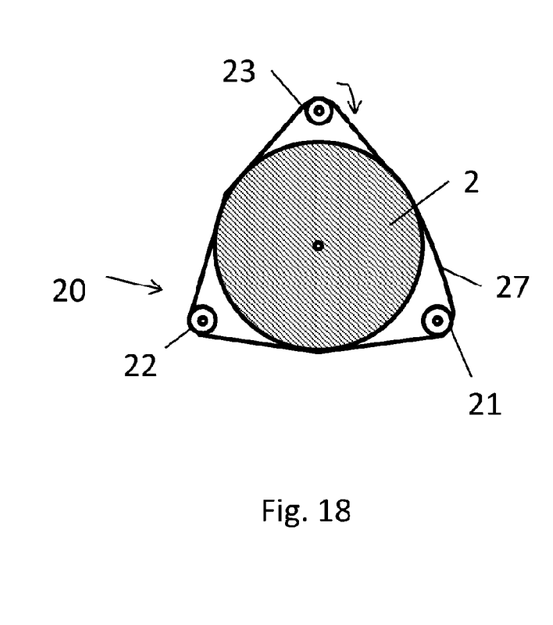
FIG. 18 shows a further variant with conveyor belt.

FIG. 18 shows an alternative to FIG. 5 above. In this case, the turning device 20 comprises three roller devices 21, 22, 23, as well as a conveyor belt arranged around the roller devices such that the conveyor belt comes into contact with the glass object 2 at three different areas. Rotation of at least one of the rollers will rotate the belt, and, thus, also, the glass object.

Figure 19:
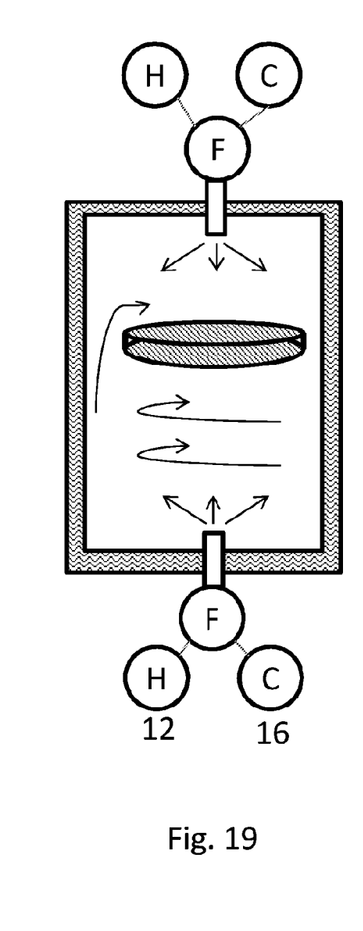
FIG. 19 shows a tempering furnace with a fluidizing layer supporting and rotating the glass object.

FIG. 19 shows an alternative tempering furnace, which generally corresponds to FIG. 4; however, wherein the turning device 20 comprises one or more lower nozzles F supplied with fluid from a hot fluid source H, and a cold fluid source C, used for heating and cooling, respectively. Here, the fluid streams from below and upwards, and creates a so-called fluidized bed, on which the glass object rests;

wherein the fluid stream may be varied such that the glass object 2 is turned. In addition, the tempering furnace may comprise an upper nozzle supplied with corresponding hot and cold fluid.

Further Alternatives

It should be noted that only one of the rollers 21, 22, 23, 23a, 23b need to be connected to a motor; of course, alternatively, more rollers may be connected to the motor, a separate motor, or to other rollers, such that more of the rollers rotate.

In the embodiments above, optimal tempering is decided by parameters such as turning speed (e.g. rotation speed, transportation speed, or other types of turning), the glass material of the glass object, tempering temperature, tempering time, cooling time, size of the glass objects, etc.

The cooling devices may also comprise bringing a cold, solid material into contact with the glass object, e.g. cold mats, etc. Such a material may be objects made from graphite.

Further, it is to be noted that choice of material for turning device, tempering furnace, cooling device, and heating device of course need to be adapted to the temperatures in question, about 400-about 900° C. Further, advantageously, parts containing precision mechanics and electrical components (motors, controlling electronics, etc.) are placed outside the housing 10 of the tempering furnace, such that these parts are shielded from the highest temperatures.

The invention claimed is:

1. A method of tempering a glass object, wherein the glass object comprises a circular surface and chamfered surfaces, comprising:
    heating the glass object, wherein the heating comprises heating the glass object until the glass object reaches a softening phase;
    cooling the glass object;
    turning the glass object during heating of the glass object, wherein the turning of the glass object is performed to counteract an effect of gravitational forces on the glass object when the glass object is heated to the softening phase; and
    turning the glass object during the cooling of the glass object,
    wherein the turning during heating and cooling of the glass object comprises the chamfered surfaces of the glass object being in contact with first and second rotating rollers, and
    wherein the first and second rotating rollers have an hourglass shape for contact with the chamfered surfaces.

2. The method according to claim 1, wherein:
    the turning during heating of the glass object comprises rotating the glass object or transporting and turning the glass object along a path.

3. The method according to claim 1, wherein heating the glass object comprises heating all of the glass object.

* * * * *